Jan. 9, 1940.   C. H. SCHURR   2,186,770
MACHINE TOOL
Filed Nov. 27, 1935   5 Sheets-Sheet 1
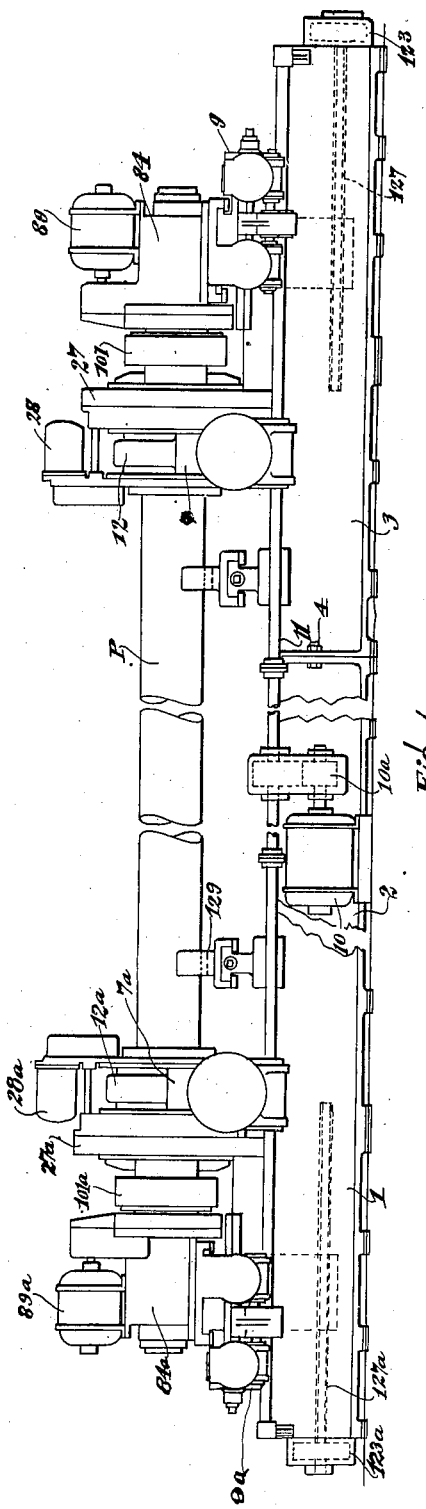
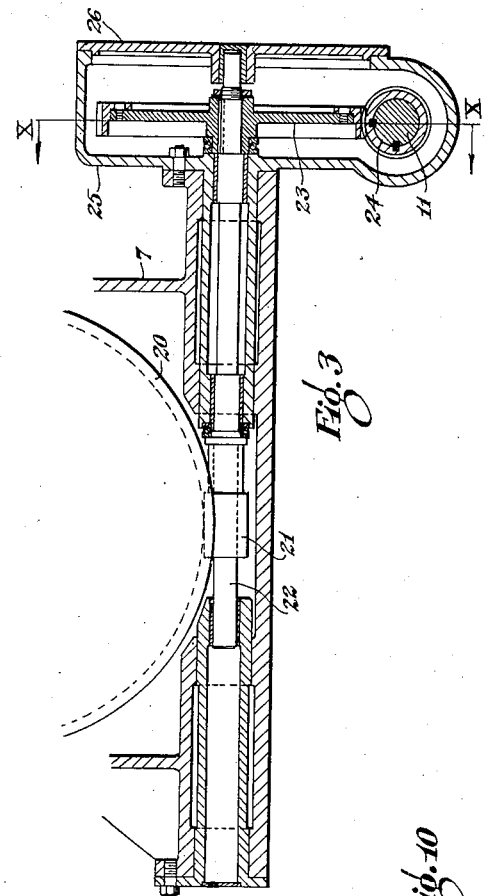
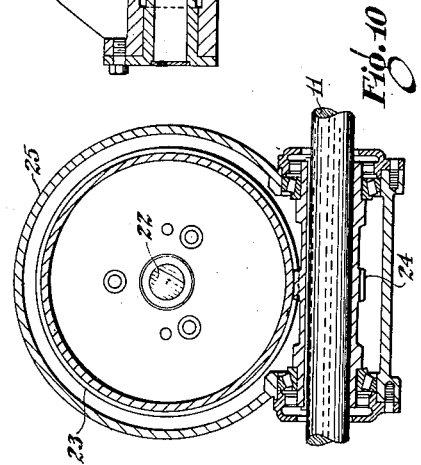
INVENTOR.
Charles H. Schurr
BY Hawgood and Van Horn
ATTORNEYS Jan. 9, 1940. C. H. SCHURR 2,186,770
MACHINE TOOL
Filed Nov. 27, 1935 5 Sheets-Sheet 3
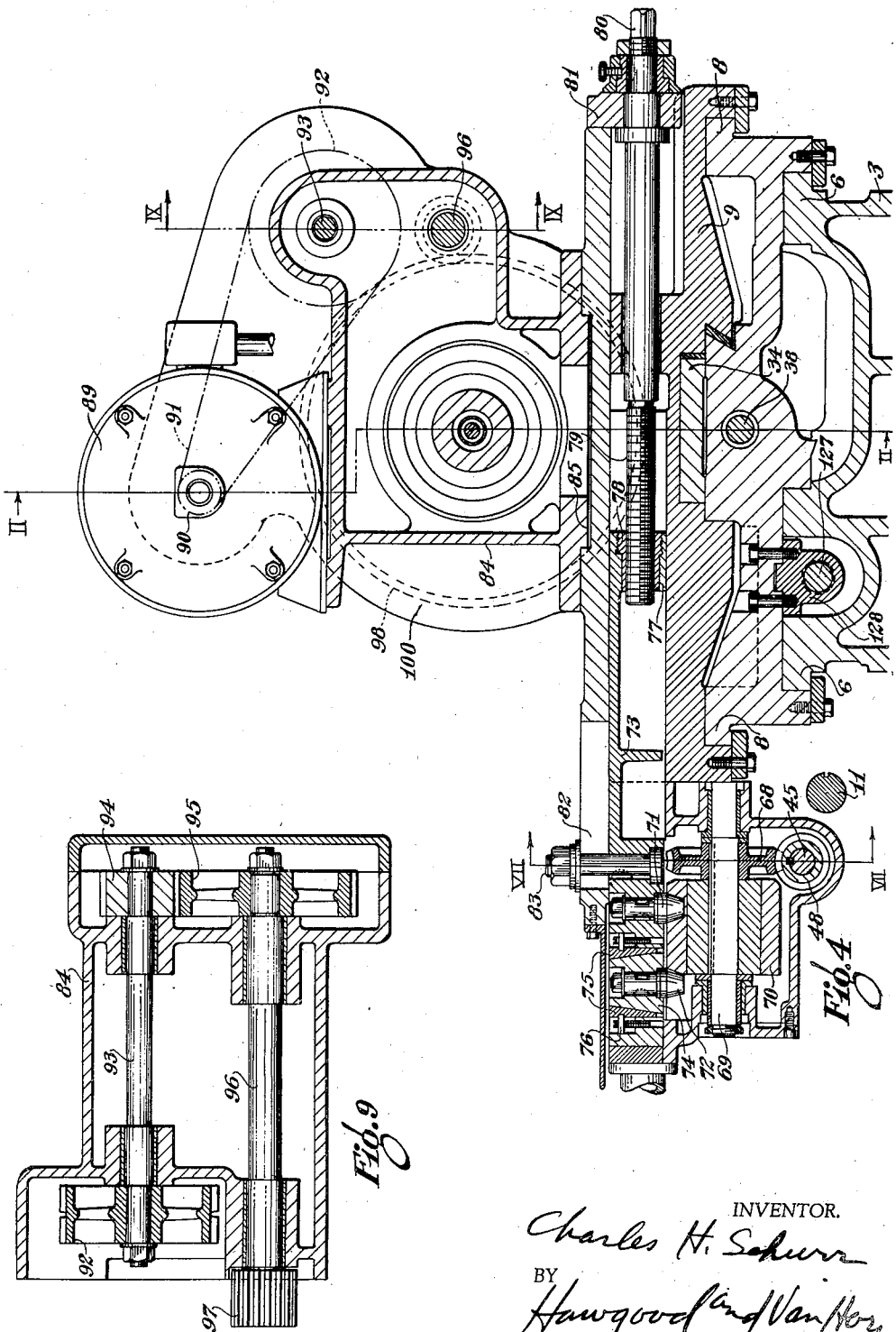
INVENTOR.
Charles H. Schurr
BY
Hawgood and Van Horn
ATTORNEYS

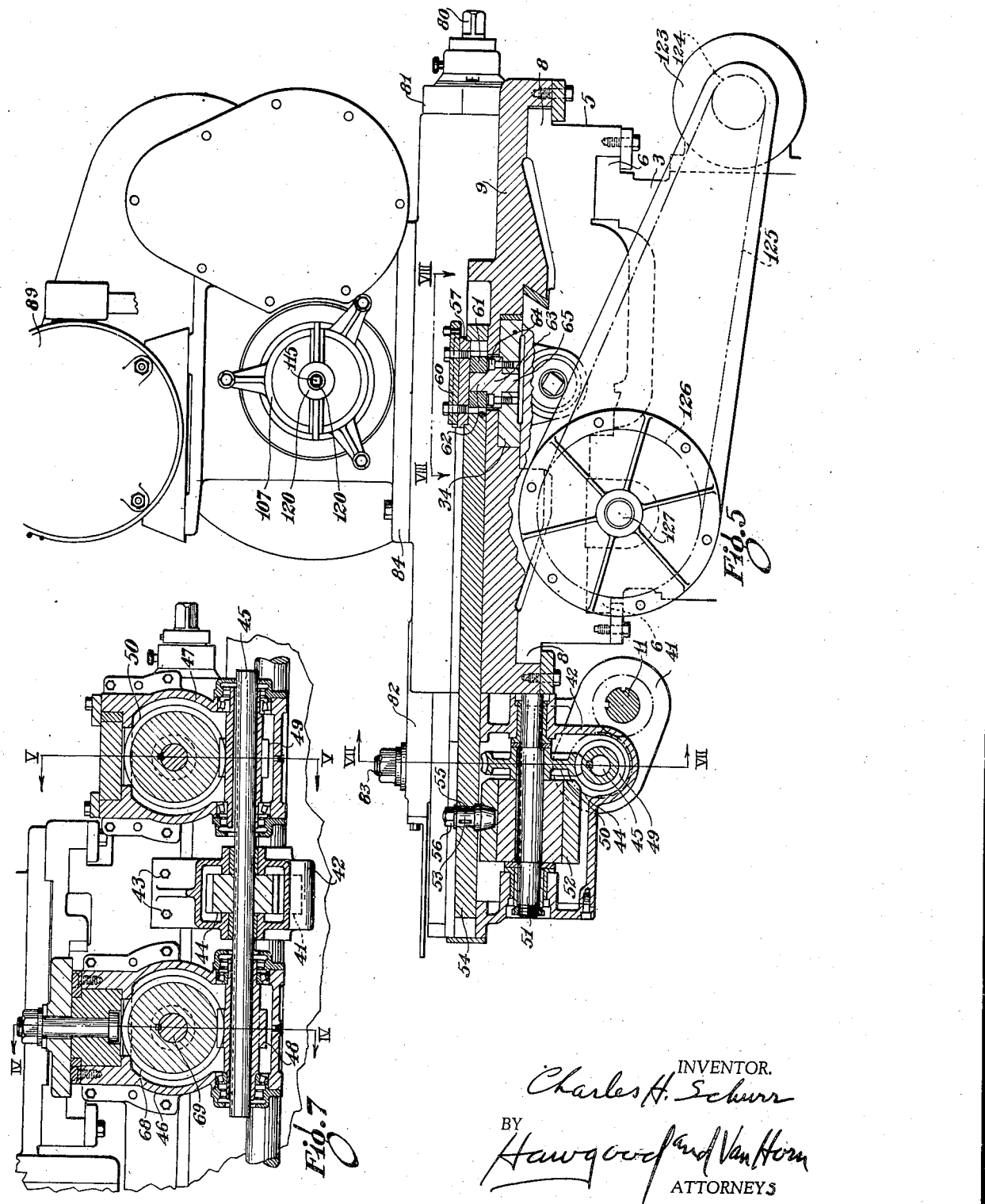

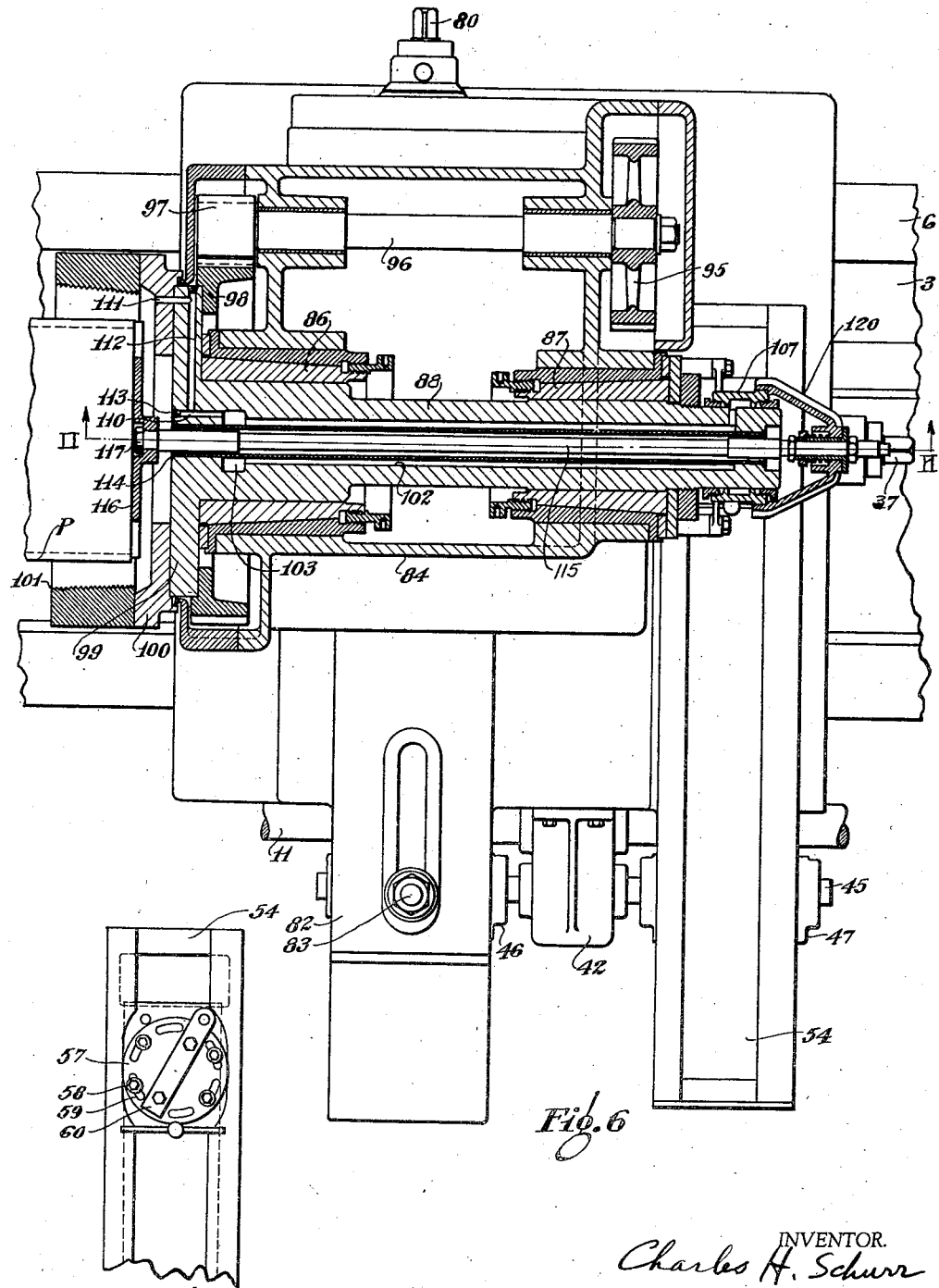

Patented Jan. 9, 1940

2,186,770

UNITED STATES PATENT OFFICE 2,186,770

MACHINE TOOL

Charles H. Schurr, Cleveland, Ohio, assignor to The Lees-Bradner Company, Cleveland, Ohio, a corporation of Ohio Application November 27, 1935, Serial No. 51,879

21 Claims. (Cl. 10—154)

This invention relates to machine tools and is particularly adapted to tools for working relatively large articles.

An object of the invention is to provide an improved apparatus which will effectively operate upon spaced parts of an article such as a blank or work piece.

Another object is to provide an improved apparatus in which work may be quickly and easily positioned and from which the work may be quickly and easily removed.

Another object is to provide an improved apparatus which will be simple in construction and operation.

Another object is to provide an improved apparatus which will be extremely rugged in construction.

Another object is to provide an improved apparatus in which independently driven units will be caused to operate in predetermined relation.

Other objects will hereinafter appear.

The invention will be better understood from the description of one practical embodiment thereof illustrated in the accompanying drawings, in which:

Figure 1 is a side elevation of a machine adapted for milling threads on large cylindrical objects such as big pieces of pipe, oil well casings, and the like;

Figures 3, 4 and 5 are transverse sectional views taken, respectively, on the lines III—III, IV—IV, and V—V of Figure 2;

Figure 6 is a horizontal sectional view taken on the line VI—VI of Figure 2;

Figure 7 is a longitudinal sectional view taken on the line VII—VII of Figures 4 or 5;

Figure 8 is a fragmentary plan view taken on the line VIII—VIII of Figure 5;

Figure 9 is a sectional view taken on the line IX—IX of Figure 4; and

Figure 10 is a fragmentary sectional view taken on the line X—X of Figure 3.

Figure 2:
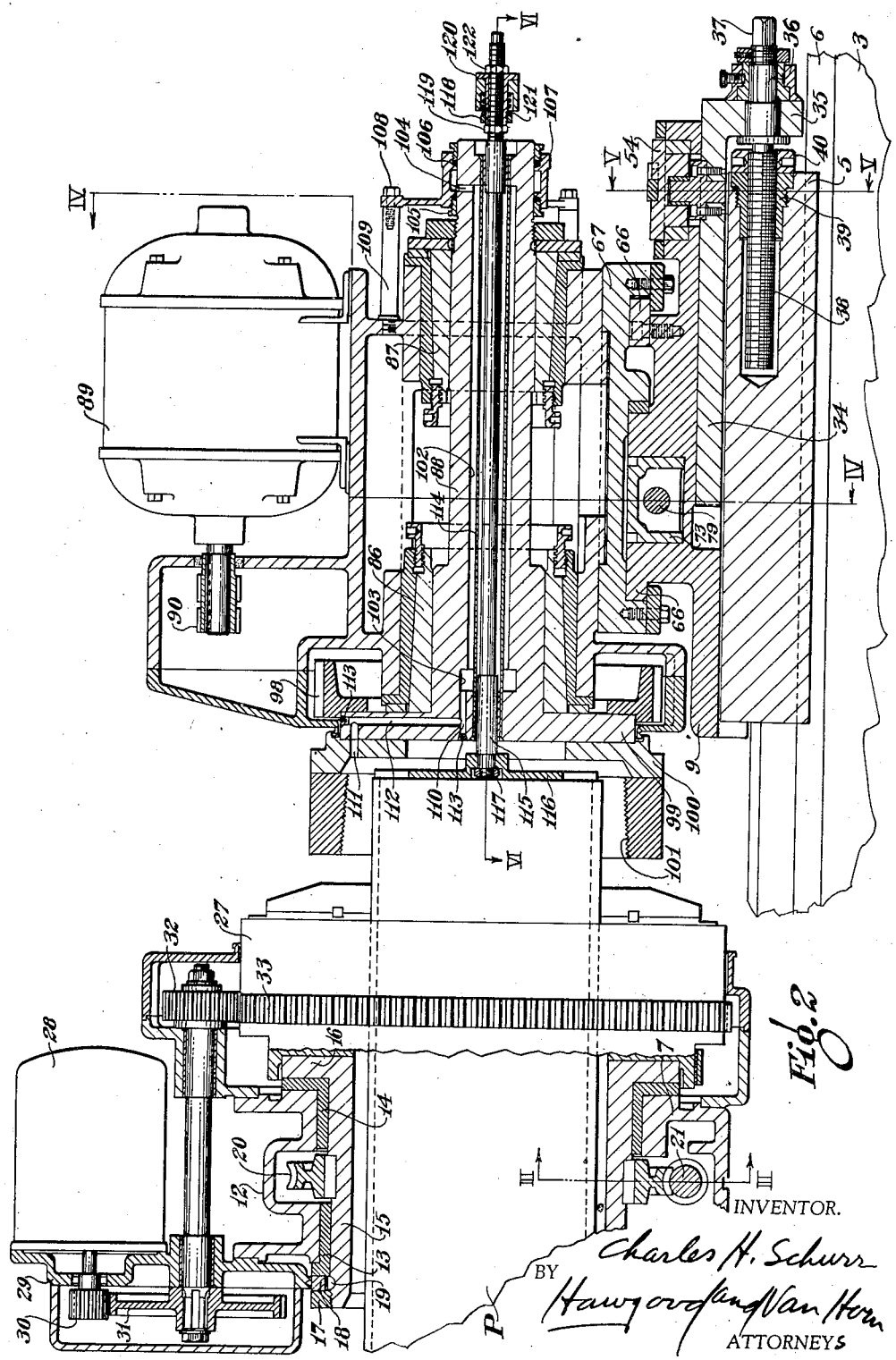
Figure 2 is an enlarged fragmentary central sectional view of parts at the right hand end of Figure 1.

In Figure 1 is shown a side elevation of a machine particularly designed for milling threads on large-sized pipe, the machine being so arranged that two threads are milled simultaneously, one on each end of the pipe, these threads being in axial alignment, and hence insuring, in a pipe line or casing constructed of pipes having their threads so made, that the axis of the whole installation will be in one continuous line, irrespective of bends or fluctuations in the shape of the individual pieces of pipe.

The machine consists of a base or bed, shown as made for convenience of three sections 1, 2, and 3, secured together by bolts 4. The end sections 1 and 3 carry similar but reverse-handled machines or elements for cutting threads, while the central section 2 of the base serves merely to maintain the end sections in alignment and to support certain of the power transmitting means. It might, if desired, be wholly omitted.

Only one machine element will be described in detail, it being understood that the other is just like it with only such variation in location of parts, direction of motion, and the like, as are required by the opposite-hand operation of the units. It will also be understood that where a part of the described machine element is identified by a reference numeral, the corresponding part of the other element will be indicated by the same numeral with the addition of the letter "a".

This machine element consists of a carriage 5, longitudinally slidable on ways 6 formed on the top of the base section 3, this carriage extending upwardly to form a housing and supporting structure 7 for the work holding apparatus, and provided on its upper surface with longitudinally extending ways 8, on which is mounted a slide 9 carrying the cutting mechanism.

Secured to base section 2 is an electric motor 10, driving through change gearing 10a, a longitudinally extending shaft 11 journalled in the base sections and provided at its ends with splines for imparting rotation to elements carried by the carriages, as will be hereinafter described.

The extension 7 is provided with a removable top 12 and both have concentric longitudinally extending bores in which are positioned bearing bushings 13 and 14, each having a peripherally extending flange abutting the sides of the extension and top, and in which is journalled a hollow or tubular spindle 15 having a peripheral flange 16 at its outer end and a ring nut 17 threaded on its inner end. A washer-like ring 18 is interposed between the ring nut and the flange of bushing 13, and is secured against rotation on the spindle as by a key 19.

Centrally of the spindle, and enclosed within the support in parts, is a worm wheel 20, keyed or otherwise secured to the spindle to rotate therewith, by which the spindle may be driven. Meshing with the worm wheel is a worm 21 fixed to a transverse shaft 22 passing beneath the spindle and journalled in the carriage (as most clearly illustrated in Figure 3) which, at its outer end, is provided with a worm wheel 23 meshing with a worm 24 splined to longitudinally extending shaft 11, the worm wheel and worm being enclosed within a casing 25 and cover 26.

Secured to the flange 16 of the spindle is a chuck 27, preferably of the type disclosed in my copending application Serial No. 37,006, filed on or about August 20, 1935, and which may be caused to grip or to release an object, such as a piece of pipe P, by means of an electric motor 28 carried on an upwardly extending bracket 29 upon the spindle housing, the motor driving through gears 30, 31, and 32 to a ring gear 33 carried by the chuck.

The lengthwise bar 34 has a depending lug 35 in which is journalled a shaft 36 provided with a squared end 37 and for manual adjustment with a wrench and a threaded inner end 38 engaging a nut 39 secured in the end of a longitudinally extending recess in the carriage. A lock nut 40 is provided for locking the shaft in adjusted position to maintain the bar in desired relation to the carriage.

Splined upon the longitudinally extending shaft 11 is a pinion 41 which is caused to travel with the carriage by being positioned between the arms of a bracket 42 secured to the carriage as by bolts 43, and in mesh with this pinion is a second pinion 44 keyed to a short longitudinally extending shaft 45 journalled in spaced depending brackets 46 and 47, also secured to the carriage.

Within the bracket 46, the short longitudinally extending shaft 45 has fixed to it a worm 48, and the opposite end, within the other bracket 47, has fixed to it a similar worm 49.

The worm 49 drives a worm wheel 50 fixed to a short transverse shaft 51 journalled in the bracket 47 and having secured to it a drum cam 52 provided with a generally helical tapered groove which is engaged by the conical end of a pin 53 passing through an aperture in a transversely extending bar 54 mounted in guides formed in the upper surface of the carriage 9.

The pin is keyed against rotation in the bore by a key 55 and a plurality of keyways may be provided so that the pin may be removed, rotated, and inserted in a different position to present new surfaces when those originally presented to the cam become worn, and is retained in position by a nut 56.

Adjustably secured upon the top of the bar is a circular plate 57 which is held in position by screws 58 passing through arcuate slots 59 and on the top of this plate is secured a sine bar 60 by means of two screws threaded into the plate.

A depending cam 61 concentric with and fixed to the plate is positioned within a recess in the bar 54 and has a straight slot underlying the bar 60 on the top of the plate. In this slot is received a trunnion-like projection 62 of a block 63, secured by screws 64 to the bar 34 and having a similar trunnion-like projection 65 firmly fixing the block to the lengthwise bar, so that as the transverse bar 54 is reciprocated the sliding motion of the cam 61 upon the projection causes the slide 9 to be moved longitudinally relative the carriage 5.

Upon the top of the slide are formed transverse ways 66 on which is slidably mounted a tool support base 67.

In mesh with a worm 48 is a worm wheel 68 keyed to a short transverse shaft 69 journalled in bracket 46 to which shaft is also keyed a drum cam 70 provided with two parallel tapering grooves, into each of which extends the end of a pin 71 or 72 similar to the pin 53 engaging the first mentioned drum cam.

One of these pins 71 is secured directly to a generally channel-shaped push rod 73 extending transversely in ways formed in the top of the slide 9, and the other pin 72 is secured to a tapered block 74. Wedges 75 are provided between the tapered block and the push rod, and their position may be adjusted by screws 76, so that the two pins may be caused to approach or separate from each other to compensate for looseness in the cam. These pins, like the pin previously described, may be rotated to different positions, presenting new surfaces when those originally in contact with the cam have become worn.

The end of the push rod 73 has a depending apertured lug 77 in the aperture of which is threaded a nut 78, and through this nut passes a threaded shaft 79, provided on its outer end with a squared end 80, and journalled in a depending block 81 secured to the tool support.

The tool spindle support base has a slotted end 82 through which passes a bolt 83 by which it may be clamped directly to the push rod when the two have been adjusted as desired by means of a wrench applied to the squared end of the threaded rod.

On the upper surface of the tool support base is a housing 84 having a circular projection 85 received within a circular recess in the top of the support base, the housing being secured to the support by screws, and in the housing are bearings 86 and 87 in which is journalled the tool spindle 88.

On the top of the housing is positioned an electric motor 89 having on its shaft a sprocket 90 over which passes a chain 91 driving a sprocket 92 attached to a shaft 93.

Journalled within a projection of the housing, this shaft, through gears 94 and 95 drives a parallel shaft 96, also journalled within the extension of the housing and having on its end the pinion 97 meshing with a gear 98 secured to the tool spindle 88.

The end of the tool spindle adjacent the chuck has an outwardly extending flange 99 to which is secured an annular holder 100 carrying an internal milling cutter 101.

The interior of the spindle is bored throughout its length and counterbored to a slightly larger diameter as shown at 102 to nearly adjacent each end. A further annular space is provided by counterboring as indicated at 103. Holes 104 are drilled from the exterior of the spindle to the counterbored part of its interior adjacent the right hand end (as seen in Figure 2) these holes communicating with an annular space between packings 105 and 106 in a spider-like fitting 107 secured by means of screws 108 to pillars 109 threaded into the housing.

At the left hand end of the spindle, holes 110 and 111 are drilled axially and are connected by radially drilled holes 112, the ends of the radial holes and of the central axial holes being closed by plugs 113.

A liner 114 consisting of a tube of copper or the like passes through the central aperture of the spindle and is sealed to the spindle at its ends.

A rod 115 passes through the liner and is provided on the end adjacent the chuck with a disc or plate 116 which may be fastened by means of a nut 117.

The other end of the rod is provided with an adjustable collar 118 held in position by a nut 119 between which collar and a forked bracket 120 secured to fitting 107 is positioned a helical compression spring 121. A nut 122 also threaded on the rod limits the expansion of the same by spring. The end of the rod is formed to actuate a switch.

Mounted on the base is an electric motor 123 having on its shaft a sprocket 124 which, through a chain 125, drives a sprocket 126 keyed to a longitudinally extending threaded shaft 127 journalled in the base and passing through a nut 128 secured to the underside of the carriage, by which the entire carriage may be moved back and forth.

Positioned between the ways on top of the bed intermediate the two machine units are the blocks 129 upon which the work may be rested while the machine units are brought into operating position.

The operation of the device is as follows:

A piece of work such as a pipe P is laid upon the V-blocks 129 upon the top of the bed, extending lengthwise of the machine. Prior to this time, both carriages have been moved to their outermost positions so that the space between the chucks 27 and 27a is greater than the length of the work piece.

The V-blocks are so arranged that the ends of the pipe are in alignment with the openings through the chucks, but the centers of the ends are slightly below the axis of the chucks.

With the parts in this position, the operator, by means of a suitable switch starts motors 123 and 123a, which, rotating threaded shafts 127 and 127a, causes the carriages to approach each other, the chucks sliding over the ends of the work. When this motion has continued until the ends of the work piece abut the discs 116 and 116a, these discs, through rods 115 and 115a actuate their respective switches associated with their ends, each stopping its associated motor independently of the other. At this time, switches controlling motors 28 and 28a are closed, either manually or automatically as by the actuation of the switches associated with rods 115 and 115a, and cause the jaws of the chucks 27 and 27a to contract and tightly grip the ends of the work piece. This motion raises work piece from the V-block so that it is entirely supported during the cutting part of the operation by the chuck jaws.

When the jaws have been sufficiently tightened, the actuation of the motors 28 and 28a is discontinued, either manually or automatically, and power is supplied by suitable switches, either manually or automatically controlled, to motors 10, 89 and 89a.

The former, through shaft 11, provides the motions which supply the feed and lead to the cutting tool, and the rotation to the work, and the latter to rotate their respective cutting tools.

Of course, while one cutter is led toward the adjacent end of the work piece, the other cutter, if cutting a thread of the same hand, must be led toward the center of the piece.

From shaft 11 power passes through worm 24, worm wheel 23, worm 21, and worm wheel 20, to the spindle 15, thus rotating the chuck 27 and with it the work P.

Power also passes from shaft 11 through pinions 41 and 44, to shaft 45, carrying worms 48 and 49. From worm 48 it passes to worm wheel 68, cam 70, and push rod 73, which feeds the cutter into depth. From worm 49 it rotates worm wheel 50, rotates cam 52, which, in turn, reciprocates bar 54, and through cam 61 carried by the bar acting upon trunnion 62 imparts a lead to the carriage corresponding to the pitch of the thread which it is desired to cut.

The cutter being fed into depth, the work need only be rotated a trifle over one revolution, the cutter of course being rotated by its separate motor 89 or 89a, and the proper pitch of the thread being afforded by the lead motion.

When this operation has been completed, motors 89 and 89a may, if desired, be stopped, but motor 10 is continued in operation, and the cams 70 and 61, now passing along oppositely disposed inclines, retract the cutter from the work and return the cutter spindle to its original position relative the chuck.

After this has been done, the switch is actuated to stop motor 10 (and motors 89 and 89a, if these have not been previously stopped). Motors 28 and 28a are next operated in a reverse direction from that in which they were originally driven, to cause the chucks to release the work and again lower it onto the V-blocks, and then motors 123 and 123a are actuated in the reverse direction to withdraw carriages, so that all parts carried by them clear the ends of the work, which may then be removed from the machine, and a new piece substituted.

If desired, motor 10 and shaft 11 may be connected directly to only one unit, while the machine element at the other end of the work may have its lead and feed controlled from its chuck, the rotation of the chuck being caused by the rotation of the work piece which is occasioned by the rotation of the chuck at the first mentioned element or unit.

This arrangement makes it possible to entirely eliminate the central section 2 of the base, and might be particularly advantageous where it is desired to have the two units separated by a clear space for the passage of work handling apparatus or the like.

Coolant fluid is constantly supplied through fitting 107, and passes through the annular space within spindle 88 and outside of tube 114, thence through holes 110, 112 and 111, and is projected upon the cutting teeth of the cutters, so that all teeth of each cutter are constantly subjected to a stream of coolant.

The pumping mechanism and pipes for supplying this coolant to fitting 107, and for draining it from the machine, have been omitted for purposes of simplification, as these may conveniently be of any desired or well known construction.

While I have described the illustrated embodiment of my invention in some particularity, obviously many others will readily occur to those skilled in this art, and I do not, therefore, limit myself to the precise details shown and described but claim as my invention all embodiments, variations and modifications thereof coming within the scope of the appended claims.

I claim:

1. A machine tool comprising two aligned separate and independently movable rotatable work holders, common driving means for rotating said work holders, two separate machine elements one associated with each work holder and each including a rotatable tool holder, and feed means associated with said machine elements, each feed means being controlled in accordance with the rotation of its associated work holder.

2. A machine tool comprising two relatively movable rotatable chucks, common driving means arranged to rotate said chucks, two machine elements each having a rotatable tool spindle associated with said chucks and movable relative thereto, feed means for moving each said machine element controlled in accordance with the rotation of its associate chuck, and independent driving means for said tool spindles.

3. A machine tool comprising two relatively movable rotatable chucks, common driving means arranged to rotate said chucks, two machine elements each having a rotatable tool spindle associated with said chucks and movable relative thereto, feed means for moving each said machine element axially of the work piece and second feed means for moving the element radially of the work piece controlled in accordance with the rotation of its associate chuck, and independent driving means for said tool spindles.

4. A machine tool comprising two aligned separate and independently movable mechanisms each including a rotatable work holder and a rotatable tool holder, separate driving means for said mechanisms arranged to move them toward and away from each other, common driving means connected to both work holders, and feed means capable of moving said tool holders toward and away from their respective work holders and actuated concurrently by said common driving means.

5. A machine tool comprising two aligned separate and independently movable mechanisms each including a rotatable work holder and a rotatable tool holder, separate driving means for said mechanisms arranged to move them toward and away from each other, common driving means connected to both work holders, feed means capable of moving said tool holders toward and away from their respective work holders and actuated concurrently by said common driving means, and feed means operated by said common driving means for moving said tool holders transversely relative their work holders.

6. A machine tool comprising two aligned separate and independently movable mechanisms each including a rotatable work holder and a rotatable tool holder, separate driving means for said mechanisms arranged to move them toward and away from each other, a contact carried by each mechanism adapted to contact the work as the mechanism moves toward it, said contact controlling said first mentioned driving means, common driving means connected to both work holders, and feed means capable of moving said tool holders toward and away from their respective work holders and actuated concurrently by said common driving means.

7. A machine tool comprising two aligned and separate independently movable machine mechanisms, each including a rotatable work holder and a rotatable tool spindle movable relative to said work holder, independent driving means capable of moving said mechanisms in their entirety toward and from each other, independent control means associated with each driving means adapted to be actuated by a piece of work within the work holders, a second independently controlled driving means associated with each mechanism arranged to drive the tool spindle thereof, a common driving means arranged to rotate both work holders, and feed means actuated by said common driving means arranged to relatively feed said tool spindles and work holders.

8. A machine tool comprising two aligned and separate independently movable machine mechanisms, each including a rotatable work holder and a rotatable tool spindle movable relative said work holder, independent driving means capable of moving said mechanisms in their entirety toward and from each other, independent control means associated with each driving means adapted to be actuated by a piece of work within the work holders, a second independently controlled driving means associated with each mechanism arranged to drive the tool spindle thereof, a common driving means arranged to rotate both work holders, and feed means for moving said tool spindles longitudinally relative said work holders and driving connections between said common driving means and said feed means.

9. A machine tool comprising two aligned and separate independently movable machine mechanisms, each including a rotatable work holder and a rotatable tool spindle movable relative said work holder, independent driving means capable of moving said mechanisms in their entirety toward and from each other, independent control means associated with each driving means adapted to be actuated by a piece of work within the work holders, a second independently controlled driving means associated with each mechanism arranged to drive the tool spindle thereof, a common driving means arranged to rotate both work holders, feed means actuated by said common driving means arranged to relatively feed said tool spindles and work holders, feed means for moving said tool spindles transversely, and driving connections between said common driving means and said feed means.

10. A machine tool comprising two aligned and separate independently movable machine mechanisms, each including a rotatable work holder and a rotatable tool spindle movable relative said work holder, independent driving means capable of moving said mechanisms in their entirety toward and from each other, independent control means associated with each driving means adapted to be actuated by a piece of work within the work holders, a second independently controlled driving means associated with each mechanism arranged to drive the tool spindle thereof, a common driving means arranged to rotate both work holders, feed means for moving said tool spindles longitudinally and transversely, and driving connections between said common driving means and said feed means.

11. A machine tool comprising two aligned and separate independently movable machine mechanisms, each including a rotatable chuck and a rotatable tool spindle movable relative said chuck, independent driving means capable of moving said mechanisms in their entirety toward and from each other, independent control means associated with each driving means adapted to be actuated by a piece of work within the chucks, a second independently controlled driving means associated with each mechanism arranged to drive the tool spindle thereof, separate driving means associated with each chuck for opening and closing the same, a common driving means arranged to rotate both chucks, and feed means actuated by said common driving means arranged to relatively feed said tool spindles and chucks.

12. A machine tool comprising two aligned and separate independently movable machine mechanisms, each including a rotatable chuck and a rotatable tool spindle movable relative said chuck, independent driving means capable of moving said mechanisms in their entirety toward and from each other, independent control means associated with each driving means adapted to be actuated by a piece of work within the chucks, a second independently controlled driving means associated with each mechanism arranged to drive the tool spindle thereof, separate driving means one associated with each chuck for opening and closing the same, a common driving means arranged to rotate both chucks, and feed means actuated by said common driving means arranged to relatively feed said tool spindles and chucks, and means for actuating said chuck-opening driving means operated in accordance with the first mentioned driving means.

13. A machine tool comprising a base, a carriage movable thereon, a rotatable gripping element upon said carriage, a machine element movably mounted on said carriage, driving means moving said carriage upon the base, and separately controlled driving means for rotating said gripping element and for moving said machine element upon said carriage.

14. A machine tool comprising a base, a carriage movable thereon, a rotatable gripping element upon said carriage, a machine element movably mounted on said carriage for movement toward and from said gripping element and laterally with respect thereto, driving means moving said machine element upon the base, and separately controlled driving means for rotating said gripping element and for moving said machine element upon said carriage longitudinally and laterally with respect to the gripping element.

15. A machine tool comprising a base, a carriage movable thereon, a rotatable gripping element upon said carriage, a machine element movably mounted on said carriage for movement toward and from said gripping element and laterally with respect thereto, a rotatable tool holder in said machine element, driving means moving said carriage upon the base, separately controlled driving means for rotating said gripping element and for moving said machine element upon said carriage longitudinally and laterally with respect to the gripping element, and independent driving means for rotating said tool holder.

16. A machine tool comprising a base, longitudinal ways thereon, a carrier slidable upon said ways, a chuck rotatably supported by said carrier with its axis parallel to said ways, a tool support movably carried by said carrier, a tool spindle journalled therein, driving means arranged to move the carriage upon the base, driving means connected to rotate the chuck and to move the tool support upon the carriage, and driving means connected to drive the tool spindle.

17. A machine tool comprising a base, longitudinal ways thereon, a carrier slidable upon said ways, a chuck rotatably supported by said carrier with its axis parallel to said ways, a tool support movably carried by said carrier, a tool spindle journalled therein, driving means arranged to move the carriage upon the base, driving means connected to rotate the chuck and to move the tool support upon the carriage, driving means connected to the chuck to open and close the same, and driving means connected to drive the tool spindle.

18. A machine tool comprising a base, longitudinal ways thereon, a carrier slidable upon said ways, a chuck rotatably supported by said carrier with its axis parallel to said ways, a tool support movably carried by said carrier, a tool spindle journalled therein, a cam arranged to move the support on the carrier, driving means arranged to move the carriage upon the base, driving means connected to rotate the chuck and to actuate said cam, and driving means connected to drive the tool spindle.

19. A machine tool comprising a base, longitudinal ways thereon, a carrier slidable upon said ways, a chuck rotatably supported by said carrier with its axis parallel to said ways, a tool support movably carried by said carrier, a tool spindle journalled therein, driving means arranged to move the carriage upon the base, driving means connected to rotate the chuck and to move the tool support upon the carriage, and driving means connected to drive the tool spindle, and means controlling said first mentioned driving means adapted to be actuated by a work piece extending into the chuck.

20. A machine tool comprising a base, longitudinal ways thereon, a carrier slidable upon said ways, a chuck rotatably supported by said carrier with its axis parallel to said ways, a tool support movably carried by said carrier, a tool spindle journalled therein, a sine bar arranged to move the support on the carrier, driving means arranged to move the carriage upon the base, driving means connected to rotate the chuck and to actuate said sine bar, and driving means connected to drive the tool spindle.

21. A machine tool comprising a base, longitudinally extending ways thereon, a carriage slidable upon said ways, a chuck journalled on the carrier with its axis parallel to said ways, a tool support carried on said carriage and movable longitudinally and transversely thereon, a shaft journalled on said frame parallel to the ways, driving means therefor, driving connections between said shaft and said chuck, two cams actuated by said shaft, connections between one of said cams and the tool support for moving said tool spindle support longitudinally on said carriage, connections between the other cam and the tool support for moving said tool support transversely on said carriage, and means for moving said carriage on said base.

CHARLES H. SCHURR.